(12) United States Patent  
Shreiner et al.

(10) Patent No.: US 7,508,643 B2  
(45) Date of Patent: Mar. 24, 2009

(54) SYSTEM FOR OVERVOLTAGE SUPPRESSION FOR CONSTRUCTION EQUIPMENT

(75) Inventors: Sidney R. Shreiner, Greencastle, PA (US); Marvin W. Krause, Cedarburg, WI (US)

(73) Assignee: Manitowoc Crane Companies, Inc., Reno, NV (US)

( * ) Notice: Subject to any disclaimer, the term of this patent is extended or adjusted under 35 U.S.C. 154(b) by 0 days.

(21) Appl. No.: 11/589,290

(22) Filed: Oct. 27, 2006

(65) Prior Publication Data

US 2008/0100977 A1    May 1, 2008

(51) Int. Cl.
```
H02H 1/00      (2006.01)
H02H 1/04      (2006.01)
H02H 3/22      (2006.01)
H02H 9/06      (2006.01)
H02H 3/20      (2006.01)
H02H 9/04      (2006.01)
```

(52) U.S. Cl. .................. 361/119; 361/117; 361/91.1; 361/91.8

(58) Field of Classification Search .................. 296/102  
See application file for complete search history.

(56) References Cited

U.S. PATENT DOCUMENTS

| | | |
|---|---|---|
| 3,600,634 A | 8/1971 | Muench, Jr. |
| 4,456,940 A | 6/1984 | Hammerberg et al. |
| 4,661,878 A | 4/1987 | Brown et al. |
| 4,715,058 A | 12/1987 | Lechner et al. |
| 4,720,845 A | 1/1988 | Lechner et al. |
| 4,849,846 A | 7/1989 | Hung et al. |
| 4,862,311 A | 8/1989 | Rust et al. |
| 4,876,620 A | 10/1989 | Borkowicz |
| 4,878,145 A | 10/1989 | Lace |
| 4,991,051 A | 2/1991 | Hung |
| 5,003,588 A | 3/1991 | Wingerath |
| 5,101,180 A | 3/1992 | Frey |
| 5,172,296 A | 12/1992 | Kaczmarek |
| 5,357,568 A | 10/1994 | Pelegris |

(Continued)

FOREIGN PATENT DOCUMENTS

RU    2 151 732    6/2000

OTHER PUBLICATIONS

Jim Lepkowski, "An Introduction to Transient Voltage Suppression Devices" ON Semiconductor, Publication Order No. AND8229/D Jul. 2005—Rev. 0, U.S.A. pp. 1-8.

(Continued)

*Primary Examiner*—Stephen W Jackson  
*Assistant Examiner*—Dharti H Patel  
(74) *Attorney, Agent, or Firm*—Brinks Hofer Gilson & Lione; Steven P. Shurtz; Nathan O. Greene

(57) ABSTRACT

An overvoltage suppression system is disclosed, such as for construction equipment, for protecting the construction equipment from overvoltages that may occur in day to day operations. An overvoltage suppression system for construction equipment may have a communication network that includes nodes. A data line may be used to electrically connect the nodes of the communication network. A semiconductor device may be electrically connected with the data line. Also, a frame of the construction equipment may be electrically connected with the semiconductor device, where the frame may be a frame common. The frame common may be adapted to include a common electrical point of the communication network.

32 Claims, 9 Drawing Sheets

U.S. PATENT DOCUMENTS

| | | | |
|---|---|---|---|
| 5,359,657 A | 10/1994 | Pelegris | |
| 5,367,569 A | 11/1994 | Roach et al. | |
| 5,416,663 A | 5/1995 | Atkins | |
| 5,422,777 A | 6/1995 | Pezzani | |
| 5,493,469 A | 2/1996 | Lace | |
| 5,513,059 A | 4/1996 | Atkins | |
| 5,537,287 A | 7/1996 | Dreier | |
| 5,543,999 A | 8/1996 | Riley | |
| 5,625,519 A | 4/1997 | Atkins | |
| 5,631,797 A | 5/1997 | Chabinec et al. | |
| 5,712,755 A | 1/1998 | Glaser et al. | |
| 5,721,663 A | 2/1998 | Smith et al. | |
| 5,734,542 A | 3/1998 | Cohen | |
| 5,751,534 A | 5/1998 | DeBalko | |
| 5,808,849 A | 9/1998 | Storbeck | |
| 5,841,620 A | 11/1998 | Masghati | |
| 5,883,775 A | 3/1999 | Maytum | |
| 5,903,426 A | 5/1999 | Ehling | |
| 5,953,194 A | 9/1999 | Atkins | |
| 6,163,447 A | 12/2000 | Pitsch et al. | |
| 6,178,080 B1 | 1/2001 | Wilken et al. | |
| 6,195,245 B1 | 2/2001 | Kobsa | |
| 6,385,030 B1 | 5/2002 | Beene | |
| 6,421,220 B2 | 7/2002 | Kobsa | |
| 6,532,140 B1 | 3/2003 | McMahon et al. | |
| 6,606,231 B2 | 8/2003 | Rumer | |
| 6,628,497 B1 | 9/2003 | Napiorkowski et al. | |
| 6,703,556 B2 * | 3/2004 | Darveniza | 174/3 |
| 6,707,656 B1 | 3/2004 | Marshall | |
| 6,882,514 B2 | 4/2005 | Mutunga et al. | |
| 6,922,323 B1 | 7/2005 | Bentley | |
| 7,050,285 B2 * | 5/2006 | Sato et al. | 361/119 |
| 7,106,573 B2 | 9/2006 | Kucharski | |
| 2002/0024791 A1 | 2/2002 | Whitney et al. | |
| 2003/0053276 A1 | 3/2003 | Mutunga et al. | |
| 2003/0076637 A1 | 4/2003 | Rumer | |
| 2004/0201035 A1 * | 10/2004 | Oka | 257/107 |
| 2004/0246644 A1 | 12/2004 | Sato et al. | |
| 2004/0252436 A1 | 12/2004 | Kucharski | |

OTHER PUBLICATIONS

"Transient Voltage Suppression Devices" obtained from http://www.epanorama.net/documents/surge/surgesuppres/html; last modified: May 28, 2002, printed on Oct. 10, 2006, Published by ELH Communications Ltd., pp. 1, 2.

"RS422/485 Application Note Chapter 4: Transient Protection of RS-422 and RS-485 Systems" B&B Electronics Manufacturing Company obtained from http://www.bb-europe.com/tech_articles/rs422_485_app_note date printed Oct. 10, 2006, B & B Electronics, U.S.A., pp. 1-6.

"Transient Arrester—Model 1549" obtained from www.dproducts.be/Drake_museum/surge.htm, U.S.A., Last Update: Dec. 22, 2005—pp. 1,2; Printed Oct. 10, 2006; pp. 1 and 2.

Han Zou, ProTek Devices "Ethernet Protection -A Whole Solution", pp. 1-9.

European Search Report for Application No. EP 07254070.1, dated Mar. 19, 2008, 8 pages.

* cited by examiner

US 7,508,643 B2

SYSTEM FOR OVERVOLTAGE SUPPRESSION FOR CONSTRUCTION EQUIPMENT

BACKGROUND

Electromagnetic phenomena, such as lightning, may be a threat to electrical equipment such as computers, radios and televisions. Various large structures, such as construction equipment, may be particularly susceptible because the electric and magnetic fields as well as associated transient voltages and currents may be attracted to tall objects. In addition, the structure of construction equipment may include metal that acts as a good conductor. Other electromagnetic occurrences such as electromagnetic interference, alternating current ("AC") induction, electrostatic discharge, AC power crosses, faults and their associated transient voltages and currents are all examples of sources that may stress electrical equipment and components, such as the electrical equipment and components associated with construction equipment. For example, surge currents and lightning strikes can lead to operating system failures, fire hazards, and other considerable damage.

BRIEF SUMMARY

An overvoltage suppression system for construction equipment may have a communication network that includes nodes. A data line may be used to electrically connect the nodes of the communication network. A semiconductor device may be electrically connected with the data line. Also, a frame of the construction equipment may be electrically connected with the semiconductor device, where the frame may be a frame common. The frame common may be adapted to include a common electrical point of the communication network.

Other systems, methods, features and advantages of the design will be, or will become, apparent to one with skill in the art upon examination of the following figures and detailed description. It is intended that all such additional systems, methods, features and advantages be included within this description.

BRIEF DESCRIPTION OF THE DRAWINGS

The components in the figures are not necessarily to scale, emphasis instead being placed upon illustrating the principles of the design. Moreover, in the figures, like referenced numerals designate corresponding parts throughout the different views.

DETAILED DESCRIPTION

Figure 1:
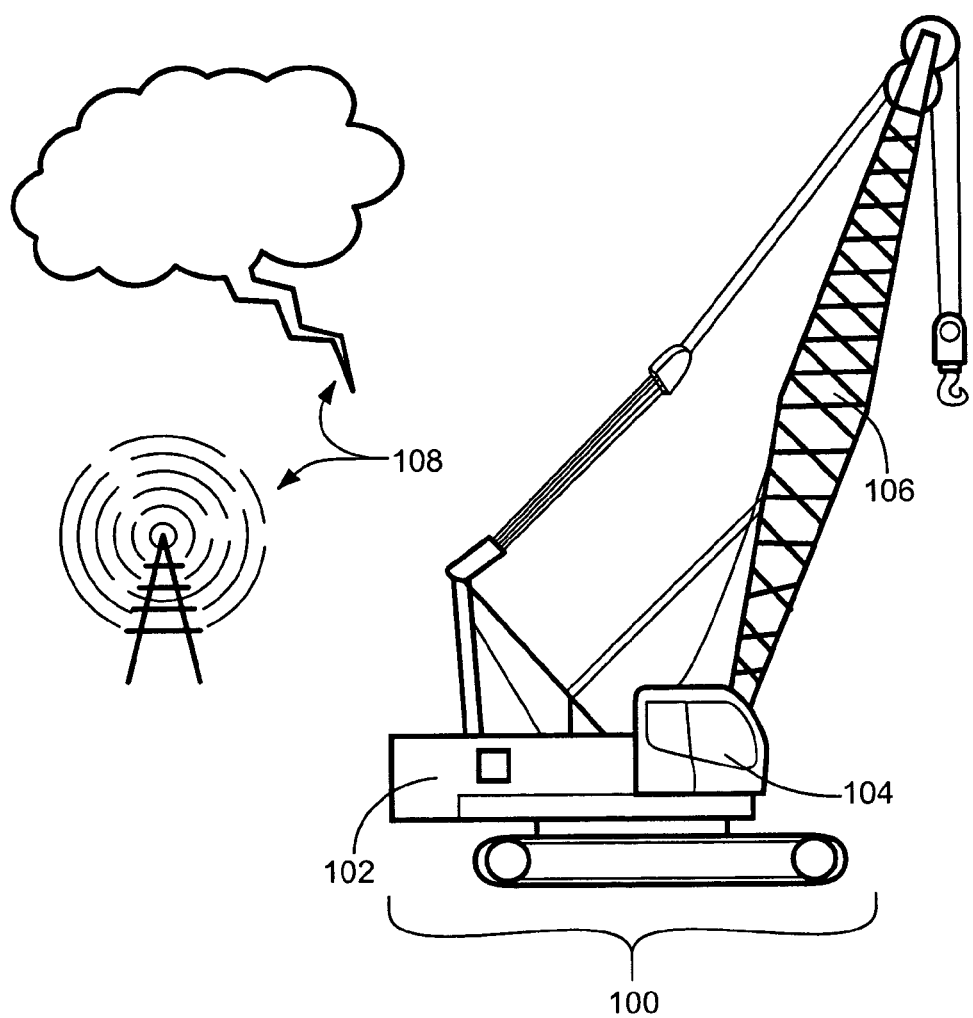
FIG. 1 is a two-dimensional drawing illustrating a basic structure of a type of construction equipment.

FIG. 1 is a side view of the basic structure of construction equipment 100 that may utilize overvoltage suppression devices, systems and methods (referred to generally as "system") described herein. For the sake of explanation, the construction equipment 100 is described as a crawler crane that includes, but is not limited to, a main bed 102, a cab 104, and a boom 106. The system, however, may be used with other types of construction equipment. The system may also be used for general vehicles, such as trucks, and in other implementations, such as for buildings. In addition to the illustrated crawler crane, the system may also be used for other types of cranes, such as railroad cranes, mobile cranes, telescopic cranes, tower cranes, truck-mounted cranes, rough terrain cranes, loader cranes, gantry cranes, overhead cranes, stacker cranes, floating cranes, and aerial cranes. Additionally, the overvoltage suppression system may be utilized in any other large mobile or stationary structure, such as structures that utilize low voltage data communications.

The overvoltage suppression system may be used to protect electronics onboard the construction equipment 100 against electromagnetic phenomena 108, such as high intensity electric and/or magnetic fields produced by lightning, or cell and telecommunication towers, as well as associated transient voltages and currents. The electromagnetic phenomena 108, may also include, but is not limited to, electromagnetic interference, AC induction, electrostatic discharge, AC power crosses, faults and their associated transient voltages and currents. Additionally, the electromagnetic phenomena 108 may include high frequency spikes in the range of kilo and mega hertz that may occur in a minimum time frame of about a nanosecond.

Figure 2:
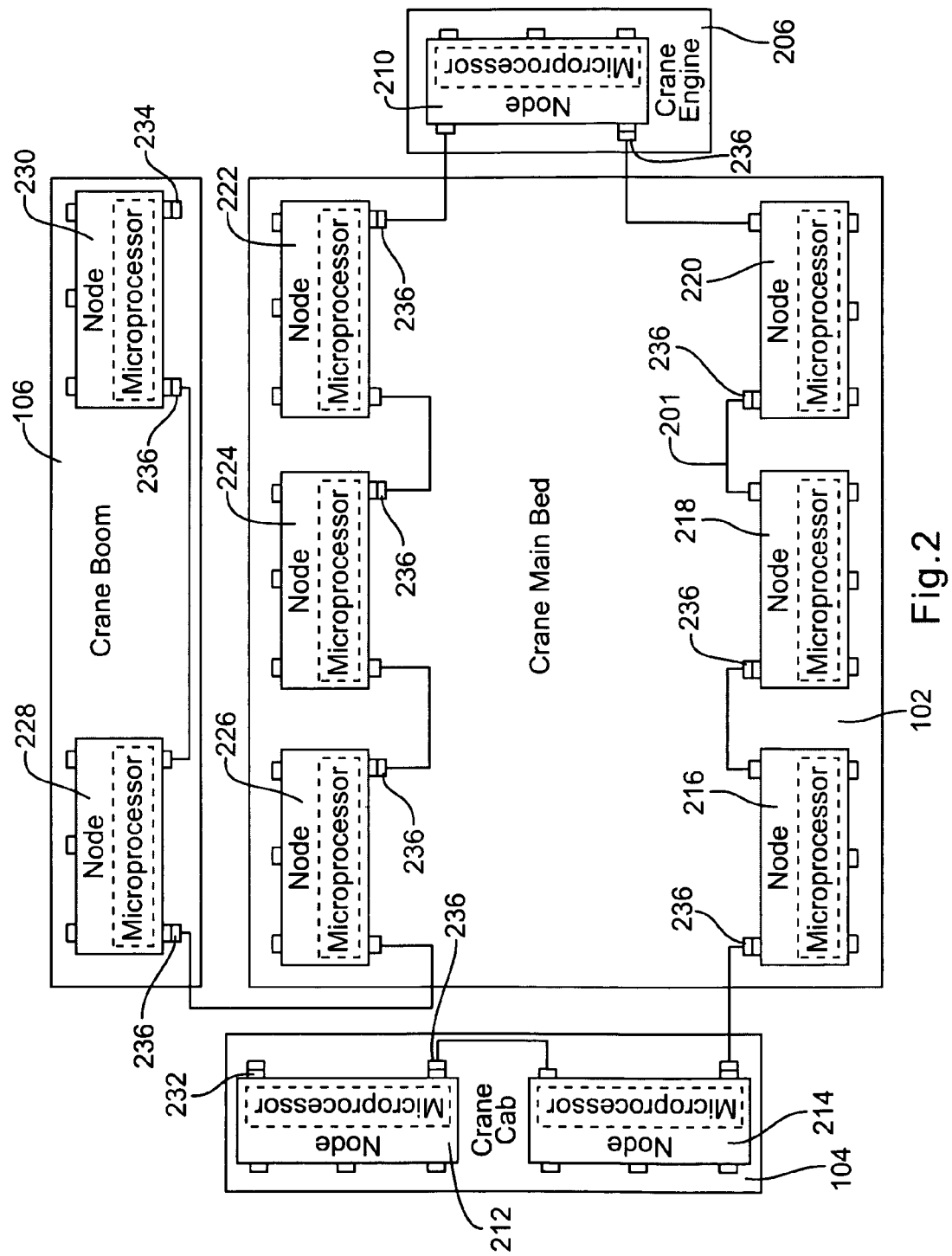
FIG. 2 is a schematic illustrating an exemplary communication network that may be used with the construction equipment of FIG. 1.

FIG. 2 is a schematic illustrating an exemplary communications network that may be used with the construction equipment 100. A Controller Area Network ("CAN") is one type of network which may control the operation of the construction equipment 100. The overvoltage suppression system may be utilized in the network, as described in more detail below, but it may also be utilized in various applications that do not use a CAN or use different communication networks.

The CAN or other-communication networks of the construction equipment 100 may include a system of interfaces, such as nodes, that may be in communication with each other. The node may be a device on the network such as a connection point, redistribution point, or end point for data transmissions and may include, but is not limited to, any one or all of a sensor, a processor, a data link, and a memory. Nodes may gather and/or communicate instructions and/or functional information to the various parts of the construction equipment 100, as well as gather and/or communicate status and operation data of the construction equipment 100. The nodes may communicate information via a communication route, such as data bus 201, or other pathways across which data may be transferred to and from a processor or to and from memory of the nodes. For example, a crane engine 206 may be electrically connected to node 210. A crane cab 104 may be electrically connected to nodes 212 and 214. A crane main bed 102 may be electrically connected to nodes 216, 218, 220, 222, 224, and 226. Also, a crane boom 106 may be electrically connected to nodes 228 and 230. Furthermore, the CAN may incorporate bus terminators such as bus terminators 232 and 234. The data bus 201 may be connected between the nodes 210, 212, 214, 216, 218, 220, 222, 224, 226, 228, 230, 232 and 234, such as in series. Overvoltage suppression devices 236, described in more detail below, may be electrically coupled between the data bus 201 and any or all of the nodes 210, 212, 214, 216, 218, 220, 222, 224, 226, 228, and 230. Alternatively, or in addition, the overvoltage suppression devices 236 may be placed in the other parts of the network, such as it may be incorporated into the data bus 201.

For example, a CAN network may be implemented with a CAN bus system, which may include an unsolicited (event driven) message mode operation with serial bus traffic. The CAN bus system may be defined as a Carrier Sense Multiple Access ("CSMA")/Collision Detection ("CD") or a Carrier Sense Multiple Access ("CSMA")/Bitwise Arbitration ("BA") bus operation. The CAN bus system may be incorporated within a microprocessor and may use a square wave differential signal with built in error detection and correction. The attendance checking of all the nodes, such as nodes 210, 212, 214, 216, 218, 220, 222, 224, 226, 228, and 230, used may be not built in, but all the data may be there for additional protocol resolutions. The input-output functions of each node, such as nodes 210, 212, 214, 216, 218, 220, 222, 224, 226, 228, and 230, may be controlled with a microprocessor inherent to the node.

An example of operation of the construction equipment 100, such as a crawler crane, may be when an operator initiates inputs, setup procedures, and an engine start as well as other protocol. The operator may then move the crane with the control handles designated as left and right track and the hand throttle or foot throttle for speed control. The nodes within the cab, such as nodes 212 and 214, may accept these input conditions and transmit a request on the bus, such as data bus 201 that may include data lines, with a node identity for nodes located in the vicinity of the track and the engine, such as node 210. The nodes at these locations, such as node 210, may have output drivers that respond to microprocessor commands to activate appropriate hydraulic valves.

Another example of operation of the construction equipment 100, such as a crawler crane, may be when an operator is instructed to lift a load. In such a case, the operator may position the crane boom 106 with a control handle, thereby generating an input at a node located within the cab 104. A message may be sent out on the bus, such as data bus 201 that may include data lines, with a node identity for a node located in the vicinity of a boom drum, such as node 220 or 222. A microprocessor within the node, such as node 220 or 222, may command a designated output driver to activate a hydraulic valve that by design rotates the boom drum with a wire rope attached for lifting the boom 106 up. A node located on the top of the boom 106, such as node 230, may provide the input conditions that control the lifting capacity of the crawler crane. The boom 106 node, such as node 230, may receive the boom angle with respect to, but not limited to, the main bed 102 center point, the wire rope limitations, and the wind speed direction. These conditions may be transmitted as priority conditions on the CAN bus system. Nodes within the cab 104 may provide outputs to the operator displays, alarms and restrictive inputs to the operator controls within the cab 104 and/or the hydraulic controls on the main bed 102. The operator, upon review of these conditions may proceed to the load drum handle to position the wire rope on the load to begin the necessary lifting of the load. The CAN bus system serial bus network messages may be processed again and the crane may begin to perform a new set of node commands to the crane's hydraulic operation by design.

Figure 3:
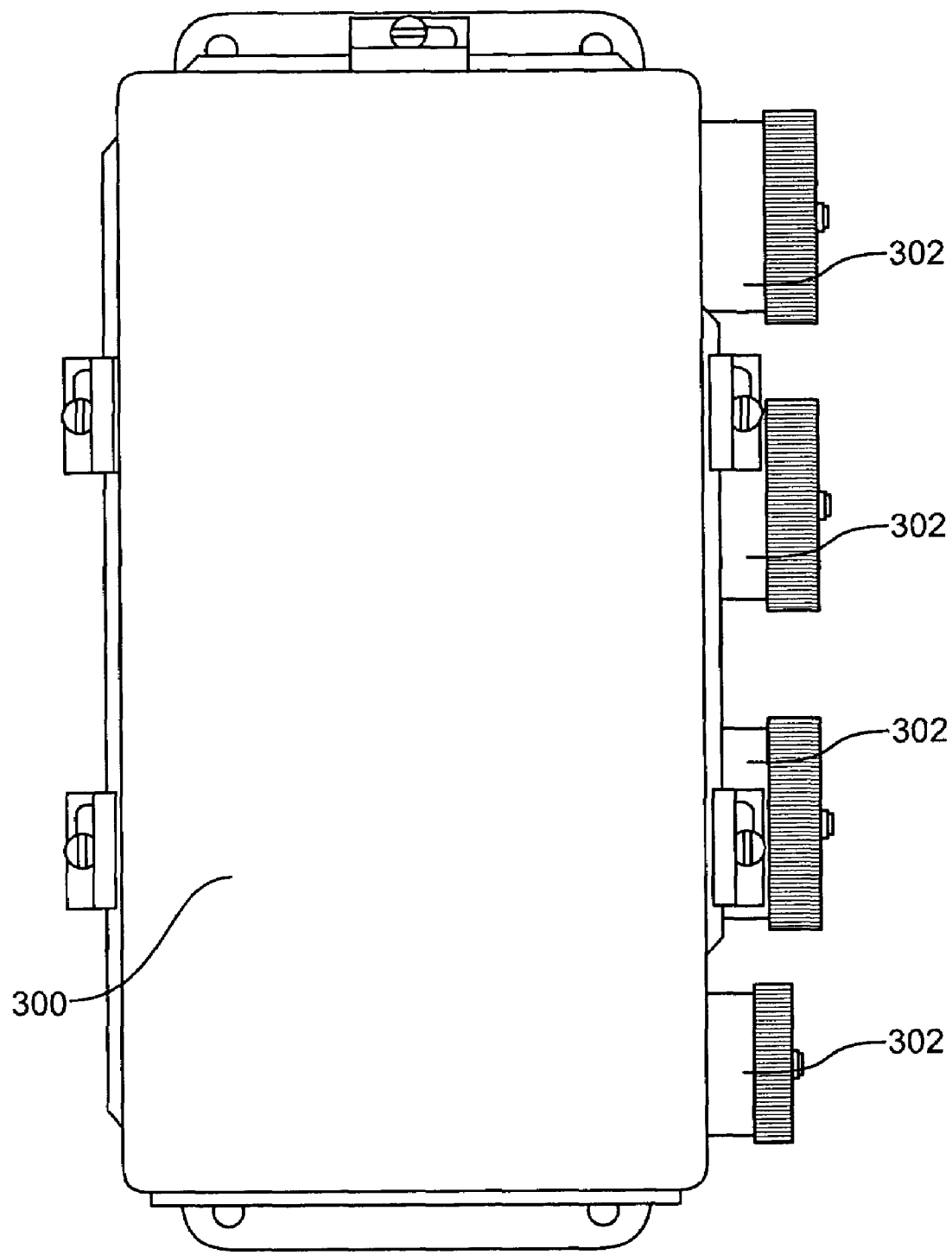
FIG. 3 is a top view of a node that may be part of the exemplary communication network of FIG. 2.

FIG. 3 is a top view of a node 300, such as any one or more nodes 210, 212, 214, 216, 218, 220, 222, 224, 226, 228, and 230, which may be part of a CAN. The node 300 may include a junction box with data ports 302. The junction box may be sealed to protect the contents from environmental elements. The housing of node 300 may include of metal or other various conductive and nonconductive materials. The node 300 may be electrically connected to the frame of construction equipment, such as construction equipment 100. For example, the housing of node 300 or a portion of it may be metal or some other conductive material. The conductive portion of the housing may be attached to the frame of the construction equipment 100, such as with screws or bolts, to supply a frame common to the node 300. A frame common may mean to be electrically conductive to a shared point, such as a frame of the construction equipment 100, or to be a common electrical point of a communication network. In other words, frame common may mean electrically common to the frame of the construction equipment 100. The frame common may or may not be connected with earth ground.

Figure 4:
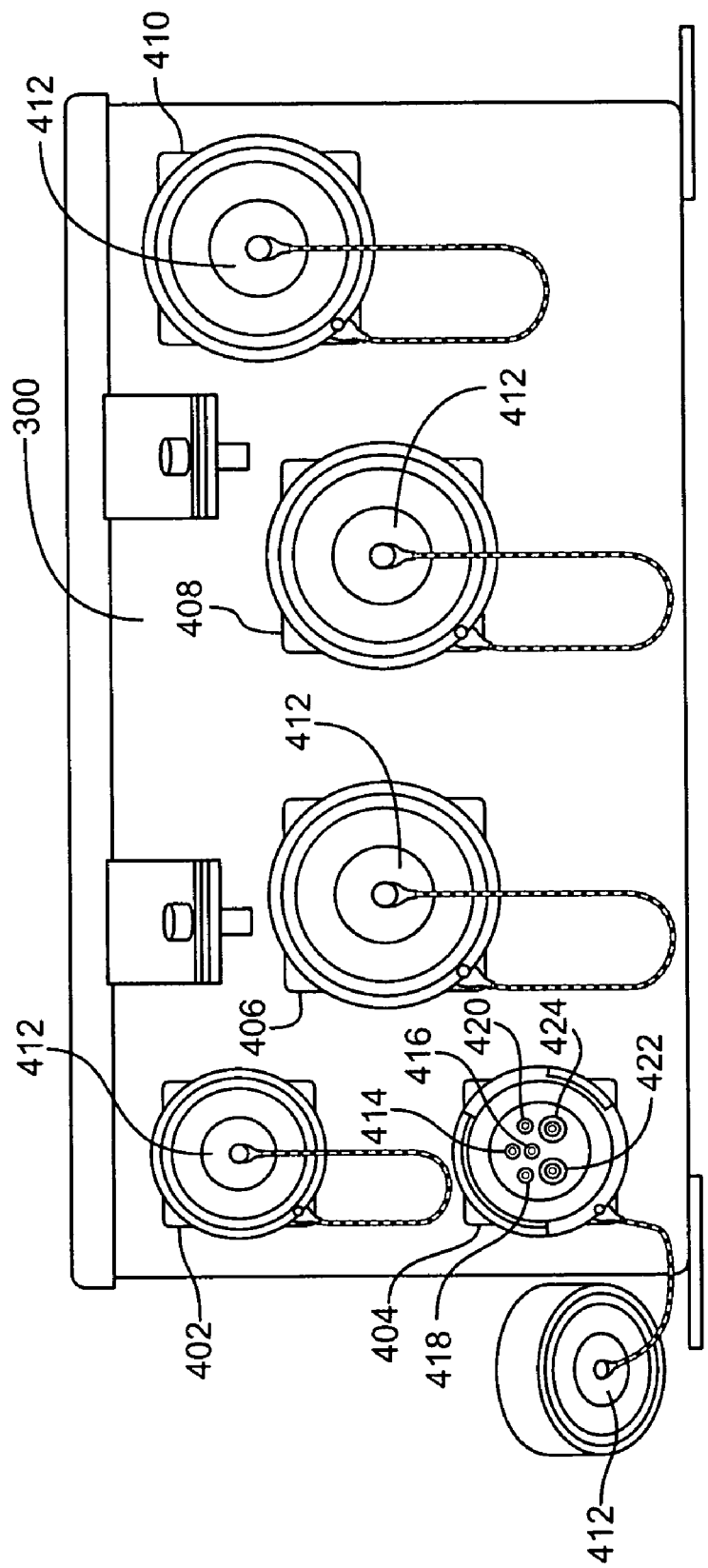
FIG. 4 is a side view of the node of FIG. 3.

FIG. 4 illustrates a side view of the node 300. Node 300 may include data ports 402, 404, 406, 408, and 410, which represent data ports 302 mentioned above. These data ports may be covered by data port caps 412, such as to protect the ports from the elements when not in use. The data ports may be designed to electrically connect to data bus lines as well as other electrical or communication lines. These lines may be electrical wire or other communication conduits. For example, data ports 402 and 404 may be designed to communicate with data bus 201, and data ports 406, 408 and 410 may be designed to communicate with various parts of the construction equipment 100, such as valves, sensors and pumps of a crawler crane. The node 300 may include, but is not limited to, a microprocessor, a personal computer board, or a controller board that may be in communication with data ports 402, 404, 406, 408, and 410, which may create an interface such that other nodes may supply information to the node 300. For example, data port 404 may include data line sockets 414 and 416, digital input line sockets 418 and 420, as well as a power supply line socket 424 and a ground line socket 422. The data line sockets may be differential data line sockets. Also, the number of sockets may vary. For example, there may be a single data line socket or a single digital input line socket, or there may be at least two data line sockets or at least two digital input line sockets as well as other various combinations.

Data port 404 may physically connect to the data bus 201. The data bus 201 may include, but is not limited to, a data line or a plurality of data lines, a digital input line, a power supply line, and a ground line. Also, the number of lines may vary. For example, there may be at least two data lines or at least two digital input lines as well as other various combinations. The data communication rate associated with the data bus 201 may be selected from a range of baud rates, which may indicate the number of bits per second that may be transmitted. For example, a baud rate of 250,000 or 250 kilo ("K") may be selected for communications occurring on the main bed 102 while a baud rate of 125,000 or 125K may be selected for communications occurring on the boom 106. Also, the power supply line voltage may be selected to be between 22 volts direct current ("VDC") and 30 VDC such as 28 VDC. Data lines may be selected to range from 0 VDC to 14 VDC such as 1 to 4 VDC. Other voltages may be used. Data lines of the data bus 201 may me differential data lines in which the difference of voltage between them may be calculated by a node, such as any one of nodes 210, 212, 214, 216, 218, 220, 222, 224, 226, 228, and 230. Based on that difference, the node may communicate information throughout the construction equipment 100, such as a crawler crane, to perform a certain operation. Also, voltage may be supplied on a digital input line communicating to the node that it may be the first or last node on the serial chain of the CAN.

Figure 5:
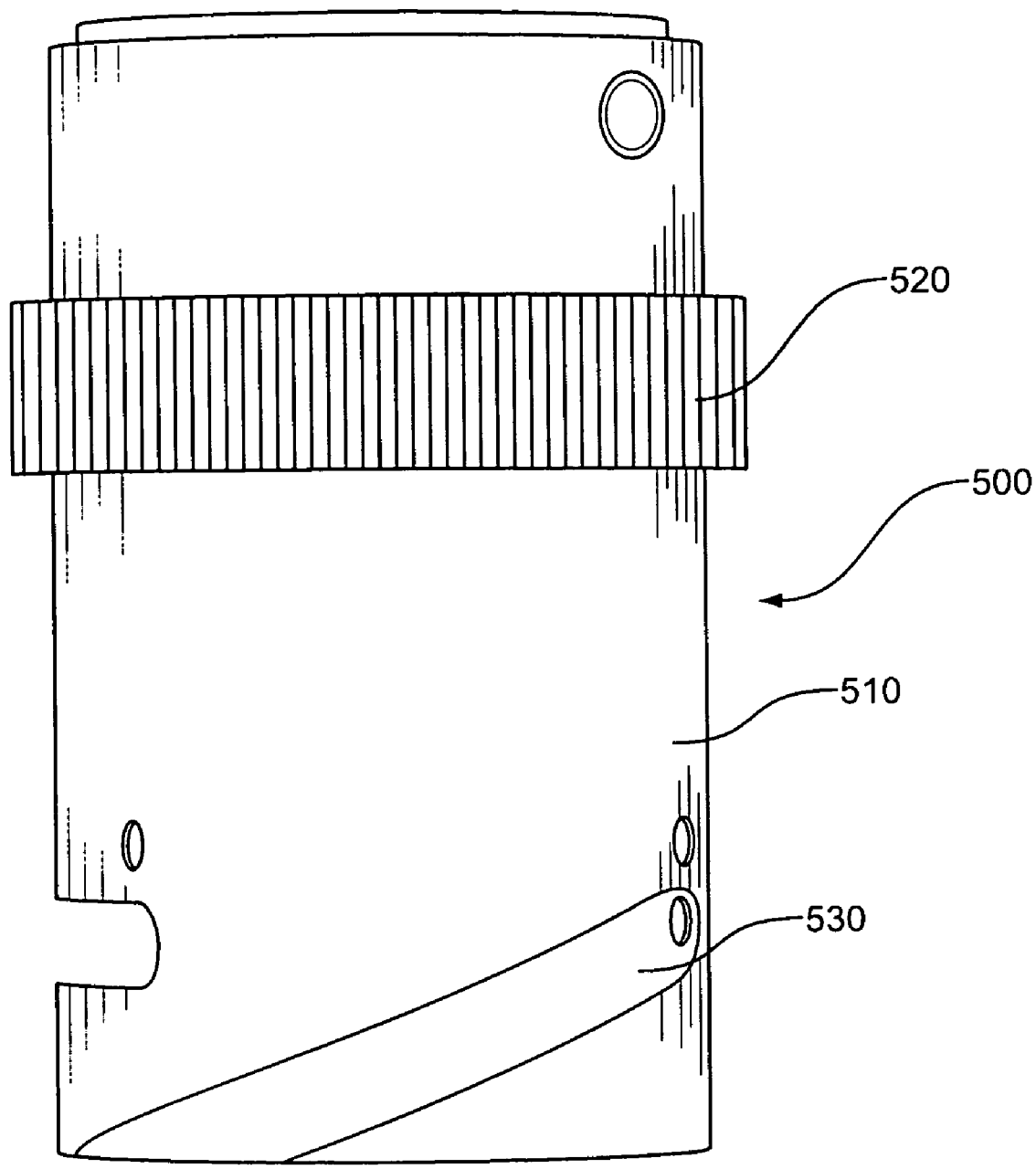
FIG. 5 is a side view of an overvoltage suppression device that may be used with the node of FIGS. 3 and 4 as well as the exemplary communication network of FIG. 2.

FIG. 5 is a side view of an exemplary overvoltage suppression device 500. The overvoltage suppression device 500 may be positioned on the construction equipment 100, such as be being placed between the data bus 201 and a node, such as any one of nodes 210, 212, 214, 216, 218, 220, 222, 224, 226, 228, and 230. The overvoltage suppression device 500 may include a housing 510 that may mechanically and electrically connect to a node. The overvoltage suppression device 500 may be manufactured of metal and/or other various conductive and nonconductive materials. For example, the housing 510 or a portion of it may be metal or some other conductive material, and therefore, the conductive portion of the housing 510 may be electrically connected to a conductive portion of a node. One way of electrically connecting the overvoltage suppression device 500 to a node may be to attach or screw in the overvoltage suppression device 500 into a data port of a node, such as data port 404, where conductive material of both the overvoltage suppression device 500 and a node may be in contact. In a version, a bayonet lock coupling nut 520 on one end of the overvoltage suppression device 500 may be connected mechanically and electrically to the data port 404. A plug of the data bus 201 with a bayonet lock coupling nut may be connected mechanically to form an electrical connection with a receptacle end 530 of the overvoltage suppression device 500. Various threads and grooves as well as any one of a variety of connection techniques may be utilized to mechanically connect the overvoltage suppression device 500 to a node, as well as a data bus, to also form an electrical connection.

Figure 6:
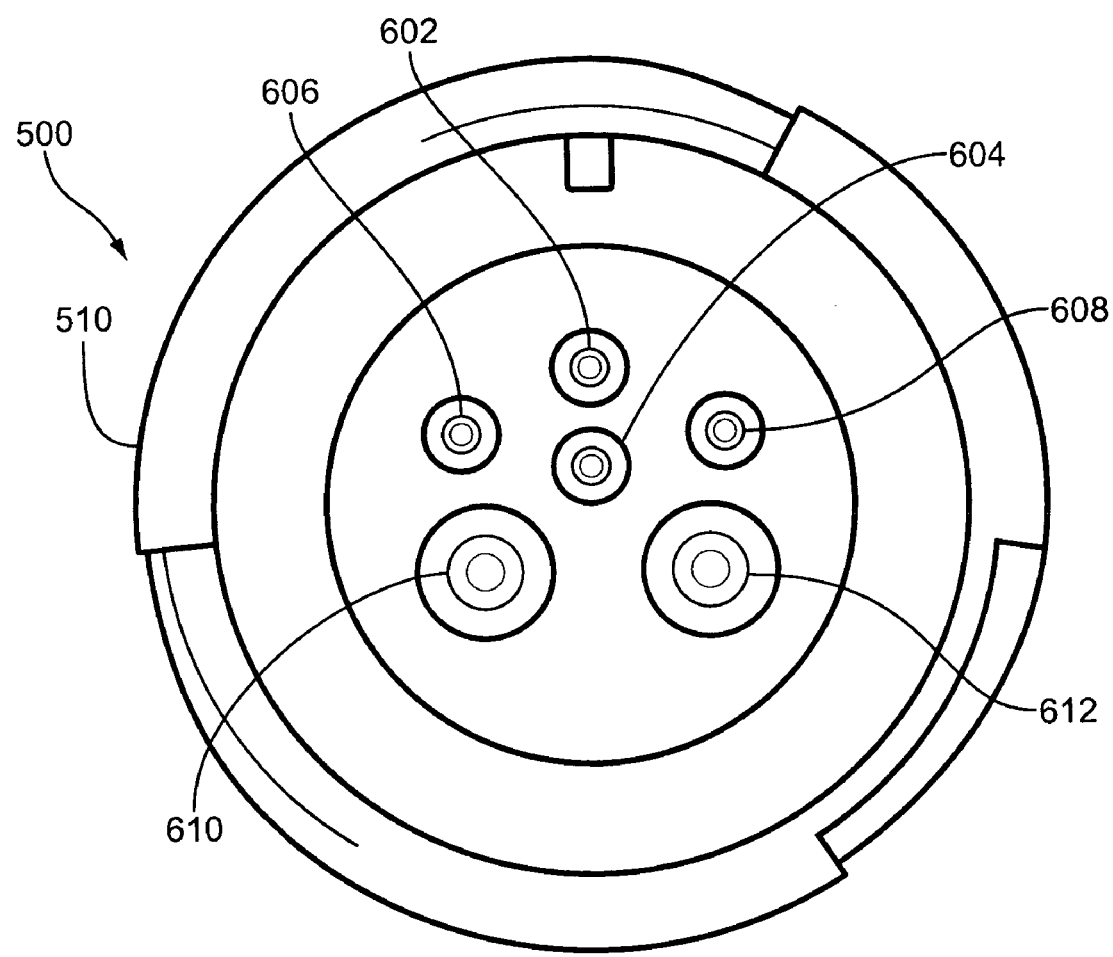
FIG. 6 is an end view of the overvoltage suppression device of FIG. 5.

FIG. 6 illustrates an end view of the overvoltage suppression device 500. The overvoltage suppression device 500 may include, but is not limited to, data lines 602 and 604, which may be differential data lines, digital input lines 606 and 608, and a power supply line 612, as well as a ground line 610 that may be disposed within the housing 510. Also, the number of lines may vary. For example, there may be a single data or digital input line, or there may be at least two data lines or at least two digital input lines as well as other various combinations. These lines may be metallic pins or other conductive pathways. A plug end of the overvoltage suppression device 500 may be inserted into a data port of a node, such as data port 404, wherein data lines 602 and 604 may be positioned to be electrically connected to data line sockets 414 and 416. Digital input lines 606 and 608 may be electrically connected to digital input line sockets 418 and 420. Power supply line 612 may be electrically connected to power supply line socket 424. Ground line 610 may be electrically connected to ground line socket 422. The receptacle end of the overvoltage suppression device 500 may be electrically connected to the data bus 201, where the data lines 602 and 604 may be electrically connected to data lines of the data bus 201, the digital input lines 606 and 608 may be electrically connected to digital input lines of the data bus 201, the power supply line 612 may be electrically connected to a power supply line of the data bus 201, and the ground line 610 may be electrically connected to a ground line of the data bus 201.

Figure 7:
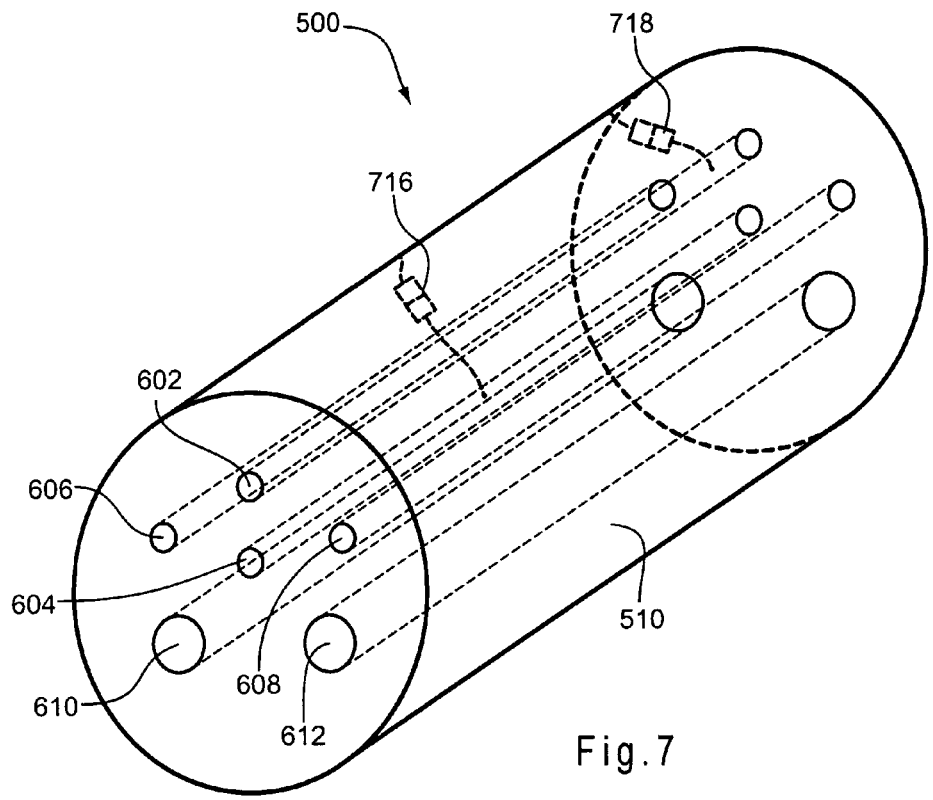
FIG. 7 is an internal view of the overvoltage suppression device of FIGS. 5 and 6.

FIG. 7 illustrates an internal view of the overvoltage suppression device 500. For example, the overvoltage suppression device 500 may include, but is not limited to, data lines 602 and 604, which may be differential data lines, digital input lines 606 and 608, and a power supply line 612, as well as a ground line 610 that may be disposed within the housing 510. These lines may be metallic pins or other conductive pathways. Semiconductor device 716 may be electrically connected between a conductive portion of the housing 510 of overvoltage suppression device 500 and data line 604. Semiconductor device 718 may be electrically connected between a conductive portion of the housing 510 of overvoltage suppression device 500 and data line 602.

The overvoltage suppression system may be utilized without using an overvoltage suppression device 500, the housing 510, or similar physical connectors. For example, data lines 602 and 604 and semiconductor devices 716 and 718 may be implemented directly onto a printed circuit board, which may be electrically connected to a node, such as any one of nodes 210, 212, 214, 216, 218, 220, 222, 224, 226, 228, and 230, or a frame common. Also, a single data line may be connected to the overvoltage suppression system to protect the processors and electrical components of the system.

Semiconductor devices 716 and 718 may include any one of a variety of semiconductor devices that conduct when a certain breakdown voltage is presented across them. Such devices include, but are not limited to, a metal oxide varistor ("MOV"), a zener diode, a thyristor, a transient voltage suppressor ("TVS") diode, a diode for alternating current ("DIAC"), a triode for alternating current ("TRIAC"), a silicon diode for alternating current ("SIDAC"), and a silicon controlled rectifier ("SCR"). For example, semiconductor devices 716 and 718 may be thyristors having two leads or at most two leads, wherein the breakdown voltage may be 15.5 volts ("V") or at most about 20V, the on-state voltage may be 1.5V or at most about 2V, and the maximum junction capacitance may be 100 Pico farads ("pF") or at most about 100 pF. The thyristor may be a bidirectional thyristor, such as a KA3Z18 manufactured by Shindengen. For example, if such a thyristor is used in the overvoltage suppression device 500, it may conduct when a voltage of 15.5V or more is presented across it. While conducting, the thyristor may clamp at 1.5V allowing large amounts of current to pass through. The thyristor may be rated to at least 150 amps ("A") at 8/20 microseconds and at least 30 A at 10/1000 microseconds. The 8 and 10 represent the rise time in microseconds, of zero to peak voltage, and the 20 and 1000 represent decay time in microseconds, of peak voltage to the 50% point.

Figure 8:
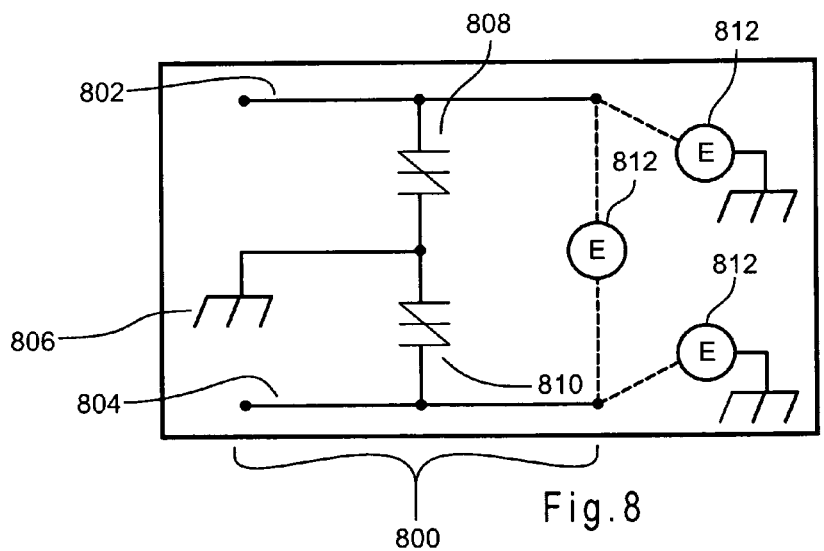
FIG. 8 is a circuit diagram illustrating an electrical connection between a network and a frame common.

FIG. 8 illustrates a circuit 800 that represents how an overvoltage suppression device, such as overvoltage suppression device 500, may electrically connect a network to a frame common. For example, an overvoltage suppression device may be electrically connected between a data port, such as data port 404, and a data bus, such as data bus 201. Data lines 802 and 804, which may be differential data lines, disposed within the overvoltage suppression device may be electrically connected to the data lines in the data bus as well as the data line sockets in the data port that feed into a node, such as any one of nodes 210, 212, 214, 216, 218, 220, 222, 224, 226, 228, and 230.

Semiconductor devices within the overvoltage suppression device 500 may be implemented with thyristors 808 and 810, wherein one end of thyristor 808 may be electrically connected to data line 802 and one end of thyristor 810 may be electrically connected to data line 804. The other ends of thyristors 808 and 810 may be electrically connected to a portion of the housing 510 of the overvoltage suppression device, wherein the portion of the housing 510 is electrically connected to a node, such as any one of nodes 210, 212, 214, 216, 218, 220, 222, 224, 226, 228, and 230. The node may be electrically connected to a frame of the construction equipment 100, such as a crawler crane, that supplies a frame common 806. Therefore, the frame of the construction equipment 100, which supplies a frame common 806, may be electrically connected to the semiconductor devices, such as thyristors 808 and 810, where the frame common 806 may be adapted to include a common electrical point of the communication network.

An overvoltage may become present on the data lines 802 and 804 in many ways. For example, electric fields 812 may be generated, a lighting strike may occur, electromagnetic interference may exist, or other electromagnetic phenomena and associated transient voltages and currents may develop. When the overvoltage occurs on the data line 802 and/or 804, which is greater than the breakdown voltage of the thyristor 808 and/or 810, the thyristor 808 and/or 810 turns on to a low on state voltage, such as 1.5V. When the thyristor 808 and/or 810 turns on, the overvoltage may be shunted to the frame common 806, via the electrical connection from the data lines 802 and/or 804 to the housing 510, from the housing 510 to a node, such as any one of nodes 210, 212, 214, 216, 218, 220, 222, 224, 226, 228, and 230, and from the node to the frame, where the frame may include the main bed 102, the cab 104, and the boom 106, that supplies the frame common 806. The connection from the data lines 802 and/or 804 to frame common 806 may be implemented in ways other than with the housing 510 and the node such as by directly making the connection to the frame via a wire or other conductor. However, the connection to the frame via a wire may not be recommended due to the electrical parameters of a wire at electromagnetic interference high frequencies.

Figure 9:
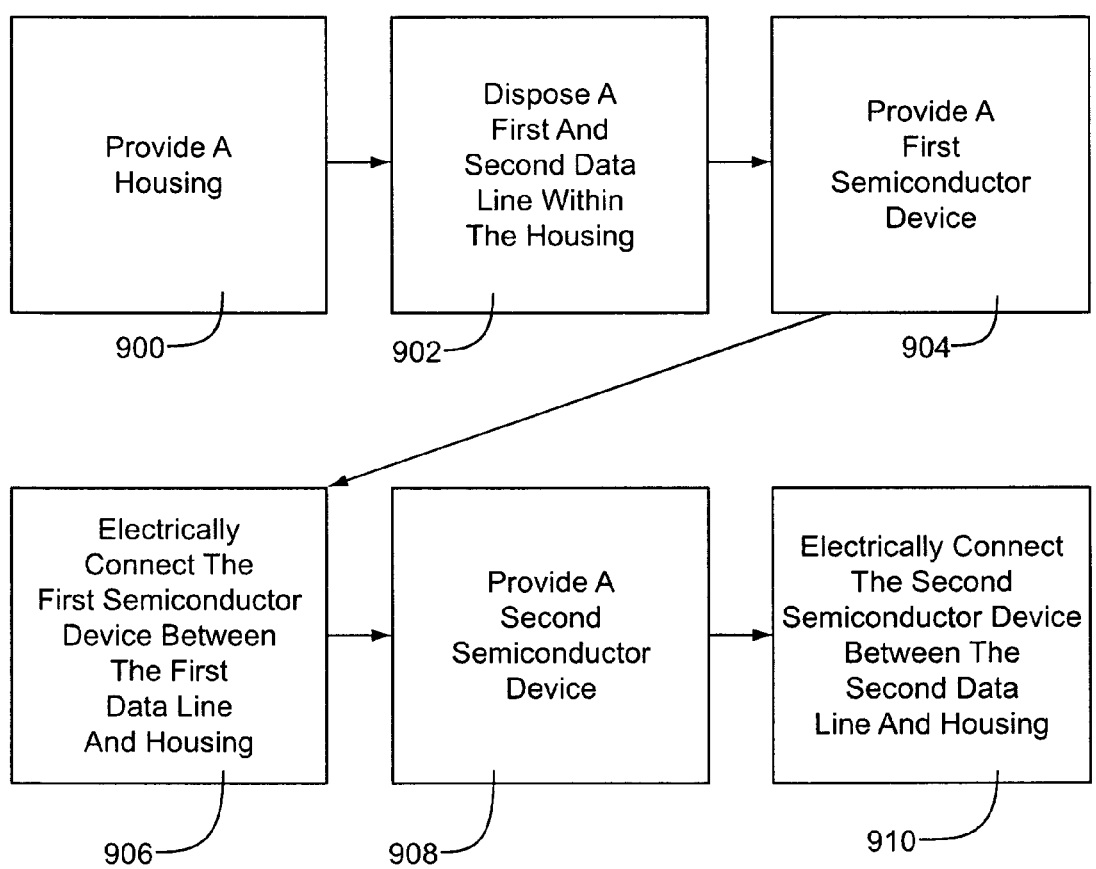
FIG. 9 is a flow chart illustrating an exemplary process for constructing an overvoltage suppression device of FIGS. 5, 6, and 7.

FIG. 9 illustrates a process for constructing an overvoltage suppression device, such as overvoltage suppression device 500. For example, one may construct such a device by providing a housing, such as housing 510, as in block 900. The housing or a portion of it may be metal or some other conductive material. After providing a housing, one may dispose a first and second data line within the housing, as in block 902. These lines may be metallic pins or other conductive pathways. Also, the data lines may be differential, and there may be at least two data lines. One may provide a first semiconductor device, as in block 904. The first semiconductor device may be anyone of a variety of semiconductor devices as discussed above. One may electrically connect the first semiconductor device between the first data line and a conductive portion of the housing, as in block 906. One may provide a second semiconductor device, as in block 908. The second semiconductor device may be anyone of a variety of semiconductor devices as discussed above. One may electrically connect the second semiconductor device between the second data line and a conductive portion of the housing, as in block 910.

Figure 10:
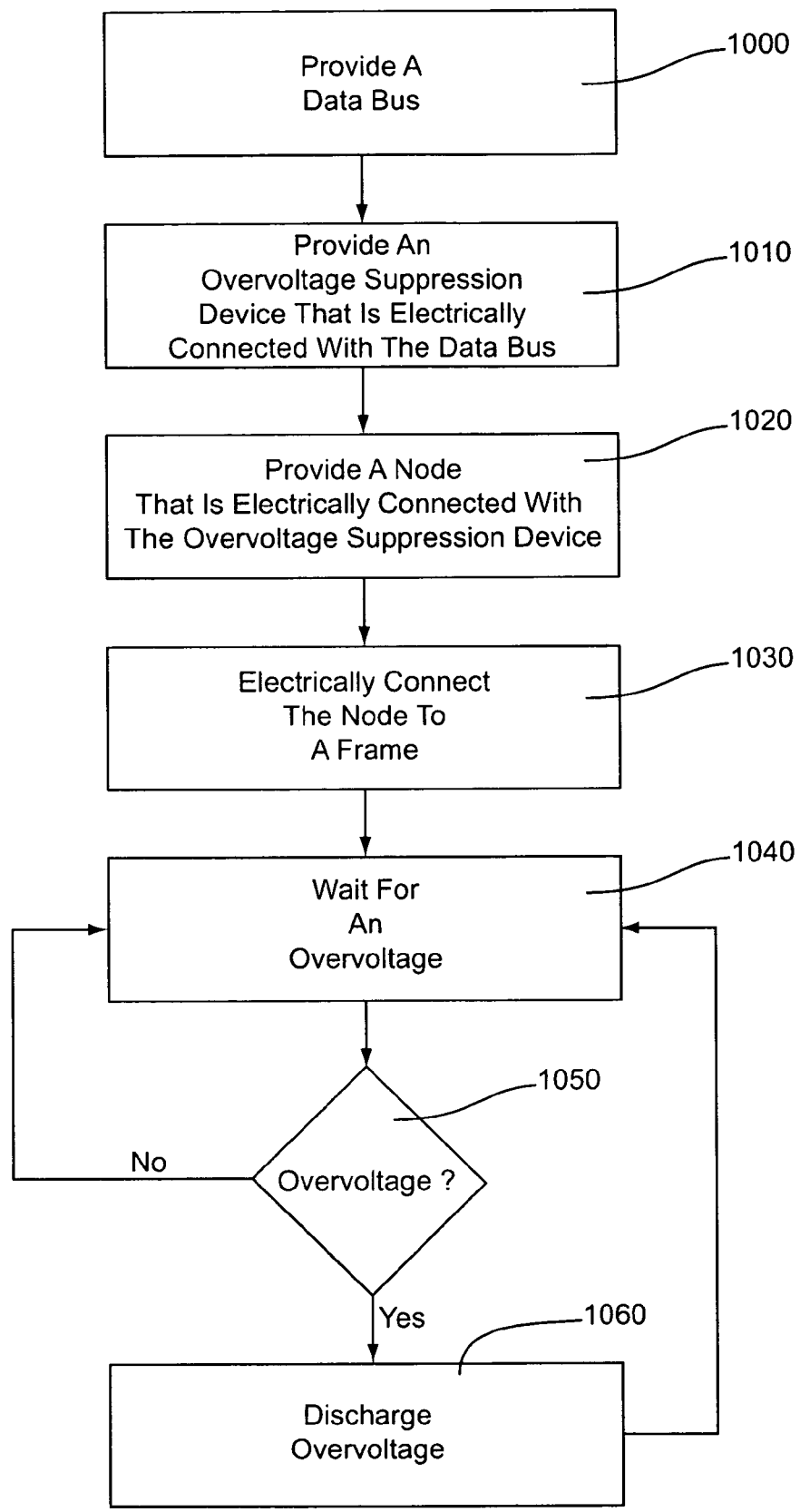
FIG. 10 is a flow chart illustrating an exemplary process for suppressing overvoltages.

FIG. 10 illustrates a process for suppressing such overvoltages. For example, a data bus may be provided, as in block 1000. Then an overvoltage suppression device, such as overvoltage suppression device 500, may be provided that is electrically connected with the data bus, such as data bus 201, as in block 1010. Furthermore, a node, such as any one of nodes 210, 212, 214, 216, 218, 220, 222, 224, 226, 228, and 230, may be provided that is electrically connected with the overvoltage suppression device, as in block 1020. A frame, such as a frame of the construction equipment 100, which may be a frame common, may be electrically connected with the node, as in block 1030. When the system is in place, the system may wait for an overvoltage to occur, as in block 1040. According to block 1050, if an overvoltage does not occur, then the system may continue to wait. If an overvoltage does occur, the overvoltage suppression device may conduct discharging the overvoltage to frame common, as in block 1060. The semiconductor device within the overvoltage device may break down to close a circuit to the frame common when a certain overvoltage is present on data lines, such as data lines 802 and 804.

Other approaches may be implemented for the purpose of embodying the overvoltage suppression system. For example, an overvoltage suppression device, such as the overvoltage suppression device 500 may be any one of a variety of connectors with various arrangements. Furthermore, for example, data lines 602 and 604 and semiconductor devices 716 and 718 may be implemented directly onto a printed circuit board, in which ends of the semiconductor devices 716 and 718 may be electrically connected to a frame common. Also, the overvoltage suppression system may use a single data line. Additionally, the number of overvoltage suppression devices, as well as the number of semiconductor devices disposed within an overvoltage suppression device or a printed circuit board, used in a CAN or other communication networks may be varied to give more or less protection.

It is intended that the foregoing detailed description be regarded as illustrative rather than limiting, and that it be understood that the following claims, including all equivalents, are intended to define the scope of this design.

We claim:

1. An overvoltage suppression system for construction equipment, comprising:
    a communication network, including a plurality of nodes, each of said nodes comprising a housing and a microprocessor located within said housing to provide a digital communication interface to the communications network;
    a data line to electrically connect said plurality of nodes of said communication network;
    a semiconductor device electrically connected with said data line; and
    a frame of the construction equipment electrically connected with said semiconductor device, wherein said frame comprises a conductive frame common, wherein said frame common is adapted to include a common electrical point of said communication network.

2. The overvoltage suppression system as in claim 1, wherein each of said nodes is coupled with said frame.

3. The overvoltage suppression system as in claim 1, wherein said semiconductor device comprises a thyristor.

4. The overvoltage suppression system as in claim 3, wherein said thyristor comprises a bidirectional thyristor.

5. The overvoltage suppression system as in claim 3, wherein said thyristor comprises at most two leads.

6. The overvoltage suppression system as in claim 3, wherein said thyristor comprises a thyristor with a breakdown voltage of at most about 20 volts.

7. The overvoltage suppression system as in claim 3, wherein said thyristor comprises a thyristor with an on-state voltage of at most about 2 volts.

8. The overvoltage suppression system as in claim 3, wherein said thyristor comprises a thyristor with a current capacity of at least 150 amps at 8 microsecond rise time and 20 microsecond decay time and at least 30 amps at 10 microsecond rise time and 1000 microsecond decay time.

9. The overvoltage suppression system as in claim 3, wherein said thyristor comprises a thyristor with a junction capacitance of at most about 100 Pico farads.

10. An overvoltage suppression device for construction equipment, comprising:
    a node including a housing, wherein within said housing is positioned a microprocessor to provide a digital communication interface and at least a portion of said housing comprises a conductor;

a first data line and a second data line disposed within said housing in communication with the microprocessor;

a first semiconductor device electrically connected between said conductor of said housing and said first data line; and a second semiconductor device electrically connected between said conductor of said housing and said second data line, wherein the conductor of the housing electrically connects with a frame common connecting a plurality of parts of the construction equipment, said frame common including a common electrical point of the construction equipment.

11. The overvoltage suppression device as in claim 10, wherein at least one of said first data line and said second data line comprises a differential data line.

12. The overvoltage suppression device as in claim 10, wherein said housing comprises a conductive material.

13. The overvoltage suppression device as in claim 10, further comprising:

a digital input line disposed within said housing.

14. The overvoltage suppression device as in claim 10, wherein at least one of said first data line and said second data line accommodates direct current voltages in the range of 0 to 14 volts.

15. The overvoltage suppression device as in claim 10, wherein at least one of said first semiconductor device and said second semiconductor device comprises a thyristor.

16. The overvoltage suppression device as in claim 15, wherein said thyristor comprises a bidirectional thyristor.

17. The overvoltage suppression device as in claim 15, wherein said thyristor comprises at most two leads.

18. The overvoltage suppression device as in claim 15, wherein said thyristor comprises a thyristor with a breakdown voltage of at most about 20 volts.

19. The overvoltage suppression device as in claim 15, wherein said thyristor comprises a thyristor with an on-state voltage of at most about 2 volts.

20. The overvoltage suppression device as in claim 15, wherein said thyristor comprises a thyristor with a junction capacitance of at most about 100 Pico farads.

21. An overvoltage suppression system for construction equipment, comprising:

a data bus;

an overvoltage suppression device electrically connected with said data bus;

a node electrically connected with said overvoltage suppression device, said node comprising a housing and a microprocessor located within said housing, said node being one of a plurality of nodes connected in series and dispersed throughout parts of the construction equipment; and a frame of the construction equipment electrically connected with said node, wherein said frame comprises a frame common, wherein said frame common is adapted to include a common electrical point of the construction equipment.

22. The overvoltage suppression system as in claim 21, wherein said data bus includes at least two data lines.

23. The overvoltage suppression system as in claim 21, wherein said overvoltage suppression device comprises:

a housing, wherein at least a portion of said housing comprises a conductor;

a first data line and a second data line disposed within said housing;

a first semiconductor device electrically connected between said conductor of said housing and said first data line; and a second semiconductor device electrically connected between said conductor of said housing and said second data line.

24. The overvoltage suppression device as in claim 23, wherein at least one of said first data line and said second data line comprises a differential data line.

25. The overvoltage suppression device as in claim 23, wherein at least one of said first semiconductor device and said second semiconductor device electrically connects said data bus to said frame common.

26. The overvoltage suppression device as in claim 23, wherein said housing comprises a conductive material.

27. The overvoltage suppression device as in claim 23, wherein at least one of said first semiconductor device and said second semiconductor device comprises a thyristor.

28. The overvoltage suppression device as in claim 27, wherein said thyristor comprises a bidirectional thyristor.

29. The overvoltage suppression device as in claim 27, wherein said thyristor comprises at most two leads.

30. The overvoltage suppression device as in claim 27, wherein said thyristor comprises a thyristor with a breakdown voltage of at most about 20 volts.

31. The overvoltage suppression device as in claim 27, wherein said thyristor comprises a thyristor with an on-state voltage of at most about 2 volts.

32. The overvoltage suppression device as in claim 10, wherein said housing connects with a node, said node comprising a separate housing coupled with said frame common and a microprocessor located within said separate housing.

* * * * *